United States Patent
Wesenhagen

[11] Patent Number: 5,975,016
[45] Date of Patent: Nov. 2, 1999

[54] SPILL FREE DOG BOWL

[76] Inventor: Humphrey Erwin Wesenhagen, P.O. B. 2714 Saratoga, Campbell, Calif. 95070

[21] Appl. No.: 09/234,821

[22] Filed: Jan. 20, 1999

[51] Int. Cl.[6] .......................................................... A01K 5/01
[52] U.S. Cl. ................................................................. 119/61
[58] Field of Search ....................................... 119/51.5, 61

[56] References Cited

U.S. PATENT DOCUMENTS

| D. 383,252 | 9/1997 | Pearce . | |
|---|---|---|---|
| D. 383,254 | 9/1997 | Feldman | D30/129 |
| 3,731,658 | 5/1973 | Livermore et al. | 119/61 |
| 3,749,062 | 7/1973 | Pirovano | 119/61 |
| 4,825,588 | 5/1989 | Norman | 119/61 |
| 4,949,678 | 8/1990 | Demko | 119/61 |
| 5,297,504 | 3/1994 | Carrico | 119/61 |
| 5,492,083 | 2/1996 | Holladay | 119/52.1 |

FOREIGN PATENT DOCUMENTS

| 722786 | 3/1932 | France | 119/61 |
|---|---|---|---|

*Primary Examiner*—Thomas Price
*Attorney, Agent, or Firm*—Robert Samuel Smith

[57] ABSTRACT

A feeding dish for a dog intended to prevent spillage of food while the dog is eating including an apron section mounted on a bowl section. The apron section presents a reentrant overhang from the lip toward the center of the bowl thereby directing food coming up the inside the bowl back into the bowl.

6 Claims, 1 Drawing Sheet

U.S. Patent    Nov. 2, 1999    5,975,016
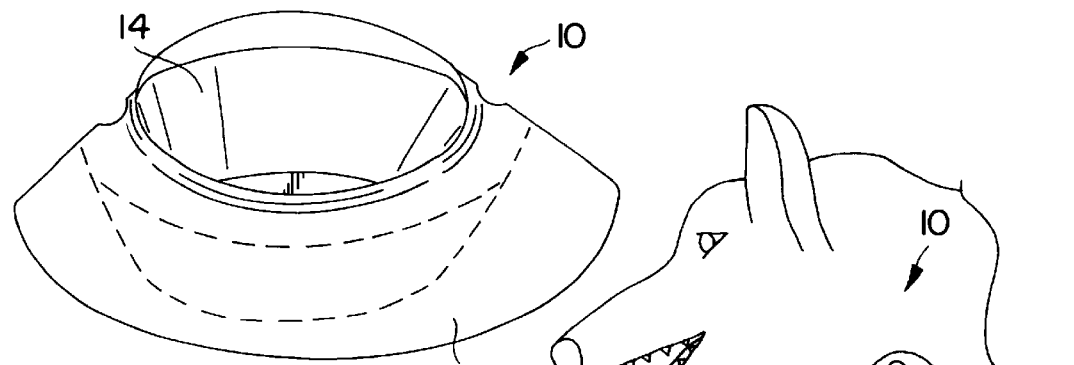
FIG. 1
FIG. 2
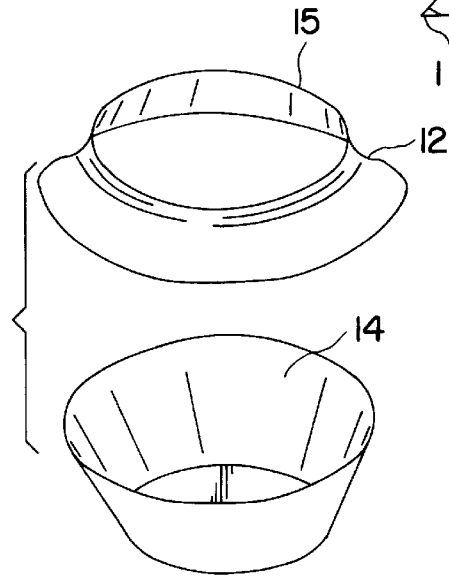
FIG. 3
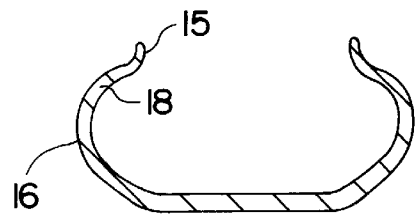
FIG. 4
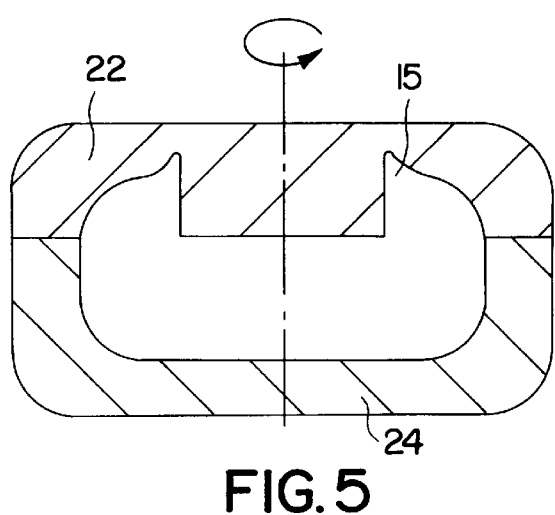
FIG. 5
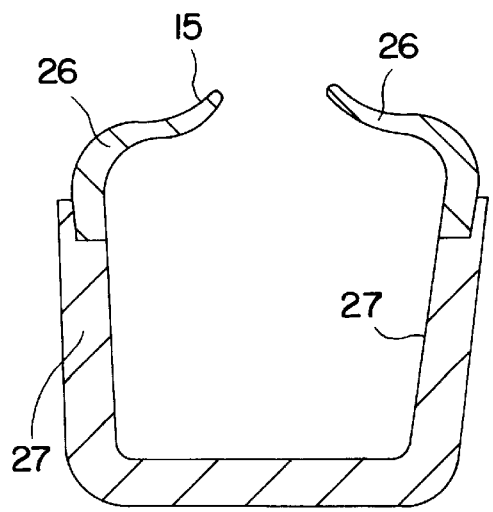
FIG. 6

SPILL FREE DOG BOWL

FIELD OF THE INVENTION

This invention relates to feeding utensils for pets and particularly to a dish for a dog that prevents spillage and will not skid as the dog is eating.

PRIOR ART AND INFORMATION DISCLOSURE

Problems that are common with feeding practices of dogs originate with the dogs requirement to apply considerable force against the inside of the bowl with his tongue and muzzle to lap up the last morsels of his meal. The result is that the dog pushes the meal out of the bowl creating a mess that must be cleaned up. A number of patents have ben issued intended to facilitate the task of feeding dogs.

U.S. Pat. No. D383,252 to Pearce discloses an animal feeding bowl with a threaded arm extending from the side of the bowl which the enables the bowl to be temporarily and firmly attached to a base such as a chain link fence.

U.S. Pat. No. D383,254 to Feldman et al discloses a bowl with a pair of handles, each handle shaped to resemble a dog bone.

U.S Pat. No. 5,492,083 discloses feeding device described as a dome shaped housing with a hinged panel that permits to the animal access to the food but prevents entry by pests such as insects and birds.

None of these devices address the problem of skid and spillage prevention with the effectiveness of the present invention.

SUMMARY OF THE INVENTION

It is an object of this invention to provide a bowl for feeding a dog that avoids spillage of the food contents and as the dog licks the inside of the bowl in pursuit of the last morsels of the meal.

This invention is directed toward a bowl having a lip that is contoured a short distance toward the interior of the bowl so that food that is pushed by the animal's tongue to the lip and is trapped between the tongue and lip enabling the dog to eat all of his food with least inconvenience. Another embodiment of the bowl provides an apron extending from the lip of the bowl to the ground so that an edge of the apron digs into the ground and prevents skidding of the bowl on the ground. The bowl with these features can be manufactured economically with a simple mold.

BRIEF DESCRIPTION OF THE DRAWINGS

FIG. 1 is a perspective view of one embodiment of the invention.

FIG. 2 is a sectional view of FIG. 1.

FIG. 3 is an exploded view of the bowl of FIG. 1.

FIG. 4 shows the bowl with the reentrant lip.

FIG. 5 shows a simple two piece mold for rotationally molding the bowl of FIG. 4.

FIG. 6 shows a standalone apron section mountable on an existing bowl.

DESCRIPTION OF AN ILLUSTRATIVE EXAMPLE

Turning now to a discussion of the drawings, FIG. 1 is a perspective view and FIG. 2 is a sectional view showing features of the dog feeding device 10 of this invention including an apron section 12 and a bowl section 14. The apron section is a fustrum of a clone with the major edge 11 of the cone extending to the support surface (floor) and prevents skidding or tipping. The minor edge (lip) 17 of the apron forms a reentrant lip over the top opening of the bowl section and has a concave curve 15 that enables the dog to trap food with his tongue 13 under the contoured lip so as to facilitate his devouring the last morsels with the concave curve 15.

FIG. 3 is an exploded view showing the apron 12 positioned over the bowl section 14. Each section can be formed separately from a thermoplastic sheet such as polypropylene, polyethylene or polyvinyl chloride using the vacuum forming technique. In a second step, the apron is thermo welded to the lip of the bowl section.

According to the embodiment of FIG. 4 showing the sectional view, when the diameter of bowl is large enough, skidding is not a problem so that the apron may be dispensed with and the bowl section 16 is provided only with the reentrant lip 18 having the concave shape 15 as a feature of the invention.

FIG. 5 shows a simple two piece mold for forming the bowl of FIG. 4 including a lip section 22 with the contoured lip 15 and a bowl section 24 providing that when the mold sections are mounted together, the bowl can be formed.

Variations and modifications of the invention may be suggested by reading the specification and studying the drawings which are within the scope of the invention.

For example, FIG. 6 shows an embodiment in which the lip section 26 of the dish may be separable (not permanently fuzed) to the bowl section 27. The mating edges of the apron section and bowl section are slightly tapered to permit temporary engagement of the apron with the bowl by a press fit. This embodiment provides for thoroughly washing the disk.

A separate standalone apron section may be provided and dimensioned to fit existing dog bowls on the market. In this arrangement, the apron may be metal (for greater durability) and the bowl may be plastic.

The dish may be made of metal. (aluminum or steel) with the apron made separately from the bowl section and joined to the bowl section by welding.

I therefore wish to define the scope of my invention by the appended claims.

I claim:

1. A dish for holding food for an animal constructed to prevent spillage and assist in the devouring of food by trapping the food with his tongue which comprises:

a bowl section having a floor member with a boundary continuously connectable to a boundary of a side wherein another boundary of the side defines an opening of the dish;

an apron section mounted on said opening to provide a reentrant lip around said opening whereby food in said dish is not inadvertently pushed out of said dish by a muzzle of said dog but is redirected into said bowl section when said animal is eating said food;

said lip being concave downwar d permitting said dog to trap food with his tongue.

2. The dish of claim 1 wherein said apron section is a frustum of a cone with a minor diameter defining said reentrant lip and a major diameter of said cone positioned to support said bowl on a flat support surface.

3. The dish of claim 1 wherein the apron section is separable from the bowl section with said apron section contoured to engage said lip of said bowl section.

4. The dish of claim 1 wherein said dish is made from a material selected from a group of materials that consists of plastic and metal.

5. An apron contoured for demountable engagement with the opening of a dog bowl for preventing spillage of food from said dog bowl being a frustum of a cone with a minor diameter defining a reentrant lip extending in from an edge of said bowl when said apron is mounted on said bowl and having a concave annular section proximal to said lip operably contoured to permit said animal to trap food with his tongue.

6. The apron of claim 5 wherein said apron is made of a material selected from a group of materials that consists of a steel alloy and an aluminum alloy.

\* \* \* \* \*